United States Patent [19]

Sutz

[11] Patent Number: 5,366,342

[45] Date of Patent: Nov. 22, 1994

[54] WATER PUMPING PUSH-PULL WINDMILL

[75] Inventor: Richard K. Sutz, Scottsdale, Ariz.

[73] Assignee: Softwind Limited Partnership, Scottsdale, Ariz.

[21] Appl. No.: 930,120

[22] Filed: Aug. 13, 1992

[51] Int. Cl.$^5$ .............................................. F03D 7/04
[52] U.S. Cl. ...................................... 416/12; 416/13; 416/16; 416/170 R; 471/336
[58] Field of Search .................. 416/9, 10, 11, 12, 13, 416/16, 170 A, 132 B; 415/4.1, 4.3, 905, 908; 417/334, 336; 74/41, 591

[56] References Cited

U.S. PATENT DOCUMENTS

| | | | |
|---|---|---|---|
| 3,209,605 | 10/1965 | Scoggins, Jr. | 74/591 |
| 4,121,471 | 10/1978 | Chancellor | 74/41 |
| 4,211,126 | 7/1980 | Sutz | 416/170 R |
| 4,427,342 | 1/1984 | Sutz et al. | 416/170 R |
| 4,507,060 | 3/1985 | Sutz | 417/336 |
| 4,723,452 | 2/1988 | Watson | 74/41 |

Primary Examiner—Edward K. Look
Assistant Examiner—Christopher Verdier
Attorney, Agent, or Firm—Head & Johnson

[57] ABSTRACT

The windmill has a stub tower having a rotatable platform carrying a wind driven fan with an input shaft driving a transmission mechanism on the platform. The mechanism carries two balanced cranks which rotate continuously and two pitman arms at opposite ends of an output cross shaft driving a single rocking beam having a massive head moved up and down. The head is coupled by flexible members to a vertical pump rod which is reciprocated by the rocking beam. A tail assembly coupled to the platform tracks the wind and rotates the platform so that the fan faces into the wind. The tracking assembly furls the fan out of the wind when the wind speed is excessive. The tracking assembly rises up on an inclined coupling rod to load the tracking assembly gravitationally when the fan is in furled position. When the wind speed decreases, the tracking assembly descends on the coupling rod to turn the platform and unfurl the fan to face the wind.

5 Claims, 4 Drawing Sheets

WATER PUMPING PUSH-PULL WINDMILL

BACKGROUND OF THE INVENTION

1. Field of the Invention

This invention concerns an improved water pumping windmill employing a wind powered multiblade rotor to drive two counterbalanced rotating cranks driving reciprocating pitman arms in parallel, which in turn reciprocate a single pivoted rocking beam to drive a vertical pump rod up and down, for pumping water from a well. The improved windmill also has means for more effectively furling the multiblade rotor and unfurling it when required.

2. Description of the Prior Art

In my prior U.S. Pat. No. 4,211,126, I introduced the concept of a more efficient water pumping wind machine system for pulling up a vertical shaft or sucker rod and a water load, and for pushing down on the rod to lower it into position for again pulling up both the rod and another water load. This system made maximum use of available wind power to drive the multiblade rotor. The system employed two counterbalance arms at opposite side of the vertical pump rod or shaft. Later improvements were made in wind driven rotor powered water pumping windmills as described in my U.S. Pat. Nos. 4,427,342 and 4,507,060, in order to obtain better performance, i.e. to produce more water at lower wind speeds. The best performance was produced by the windmill type having double counterbalance beams in a push-pull system as described in my U.S. Pat. No. 4,507,060. However it was found that at lower wind speeds generally prevailing in many areas, insufficient quantities of water were being pumped when sufficient windpower was available to to drive the multiblade rotor.

Other difficulties were encountered with the rotor furling and unfurling systems heretofore used in prior windmills. Such furling was required when the wind speed became excessive as happened occasionally during wind storms. Failure to furl the rotor out of the wind immediately often resulted in major damage and even destruction of the windmill. Failure to unfurl the rotor after the wind speed was reduced to normal magnitudes, kept the windmill inactive and required manual attention to turn the rotor to face the wind again. I have found that most of the difficulties with prior furling systems was caused by the use of a coil spring or springs to tension the rotor or rotor support, when the rotor was furled, and to turn the rotor to face the wind when unfurling. Since the springs are constantly exposed to the weather, they often became corroded or fatigued and did not respond properly in conditions of excessive wind speed, and they did not turn the rotor back to face the wind when the wind speed was reduced.

Other disadvantages encountered with prior wind machine systems were excessively high manufacturing costs, expensive field installations, complex installation and repair procedures, and overly frequent and difficult field maintenance requirements.

SUMMARY OF THE INVENTION

The present invention is directed at overcoming the above mentioned and other difficulties and disadvantages encountered with prior windmill systems. The present invention constitutes a major improvement in the art of high performance water pumping windmills. The present improved system employs a new crank counterbalanced mechanism to counterbalance 100% of the reciprocating vertical pumping shaft or sucker rod plus 50% of the water being pumped. The new system requires the least start up torque provided by the wind. Due to the improved geometry of the system, the upstroke of the pump rod occupies a larger part of the pumping cycle than the downstroke.

Another important feature of the invention is the ability of the system to track the direction of the wind, and hence present the rotary fan's full diameter (full cross sectional area) to the wind, particularly during periods of low wind. The improved arrangement of mast pipe, stub tower and main frame permit effortless tracking in wind speeds as low as 1.5 miles per hour.

The present system also has an improved furling mechanism. Furling is a critical function which prevents damage to the windmill during periods of high wind and which allows manually furling the windmill's fan during periods when maintenance is required. The ability to furl the rotary fan out of the wind quickly is critical to prevent catastrophic damage to the windmill; and this is accomplished automatically by the present furling mechanism. As mentioned above prior windmills employed a spring to assist in returning the windmill head into the wind after it had started to unfurl. The present invention by contrast employs an angled tailbone support that forces the tail to move up an incline during the furling motion. As a result the tail is self biased by gravity to return the rotary fan into the wind. This is very effective, and requires less field maintenance because there is no spring to corrode or wear out.

In the present invention, the number of components is reduced. For example, the walking beam structure is simplified and can be manufactured at lower cost than for prior windmills. Also with this simplified structure maintenance requirements are reduced, and improved performance is obtained.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENT

Figure 1:
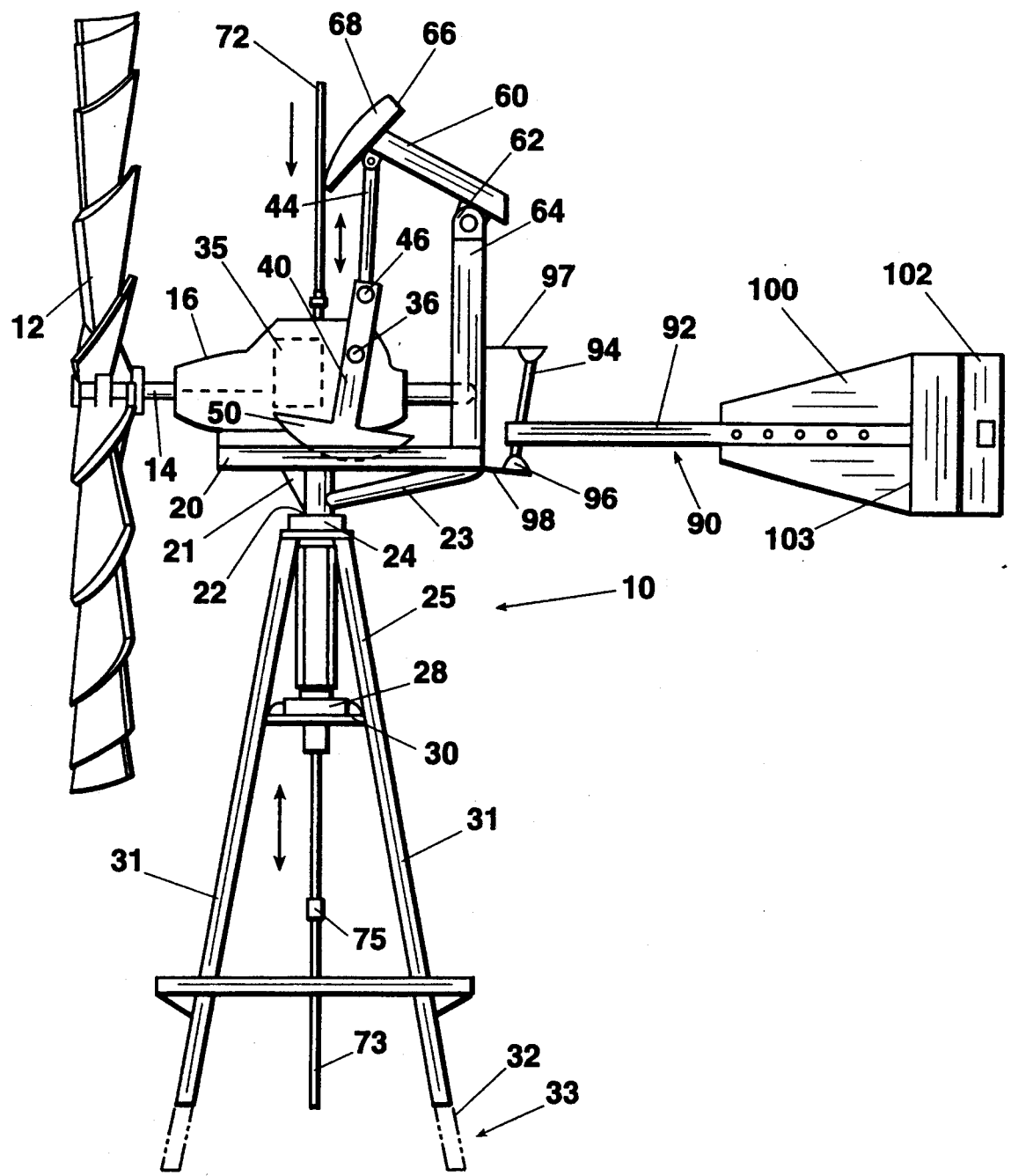
FIG. 1 is a side elevational view of a windmill head embodying the invention.
Figure 2:
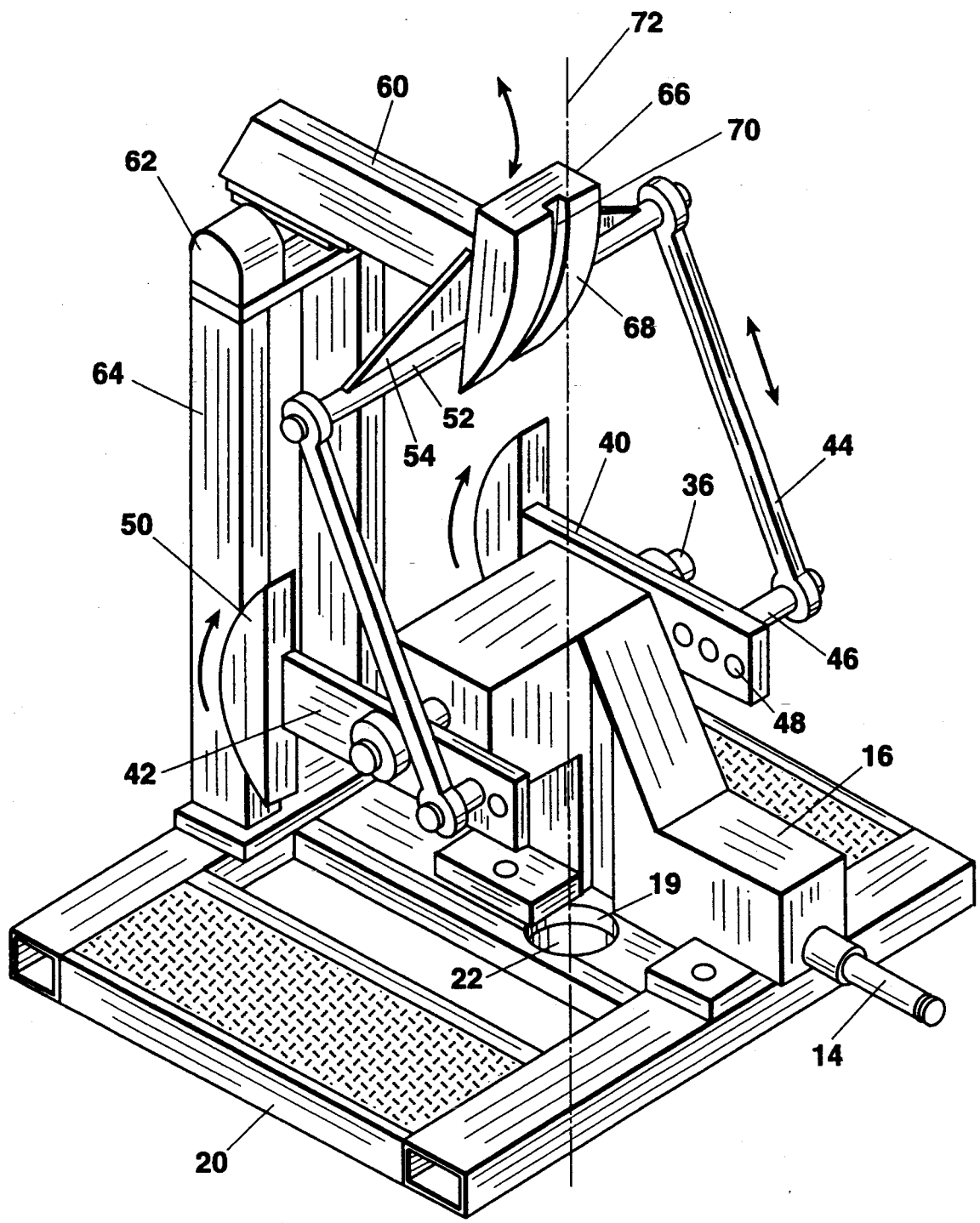
FIG. 2 is an enlarged isometric view of a rotary balanced subassembly of the windmill head.

Referring now to the drawings wherein like reference characters designate like or corresponding parts throughout, there is illustrated in FIGS. 1 and 2 a windmill head 10 including a multiple blade rotary fan 12 mounted on a horizontal shaft 14 and disposed to face into the wind impinging on the face of the fan to turn it. Shaft 14 turns with fan 12 and is carried by a transmission case 16 mounted on a horizontal, turnable platform or turntable 20. This platform is a strong, relatively lightweight rectangular frame structure secured by brackets 21 and 23 on an axially vertical mast pipe 22 carried by upper bearing assembly 24 at the top of a tapered stub tower 25, and lower bearing assembly 28 carried by apertured plate 30 near the top of stub tower 25. Mast pipe 22 is a massive, rigid structure for supporting the full weight of the platform and the components mounted thereon, and the pushing and pulling forces to which the mechanism is subjected during operation. Legs 31 of stub tower 25 can be clamped and bolted to angle beams 32 of a conventional high windmill tower 33.

Figure 3:
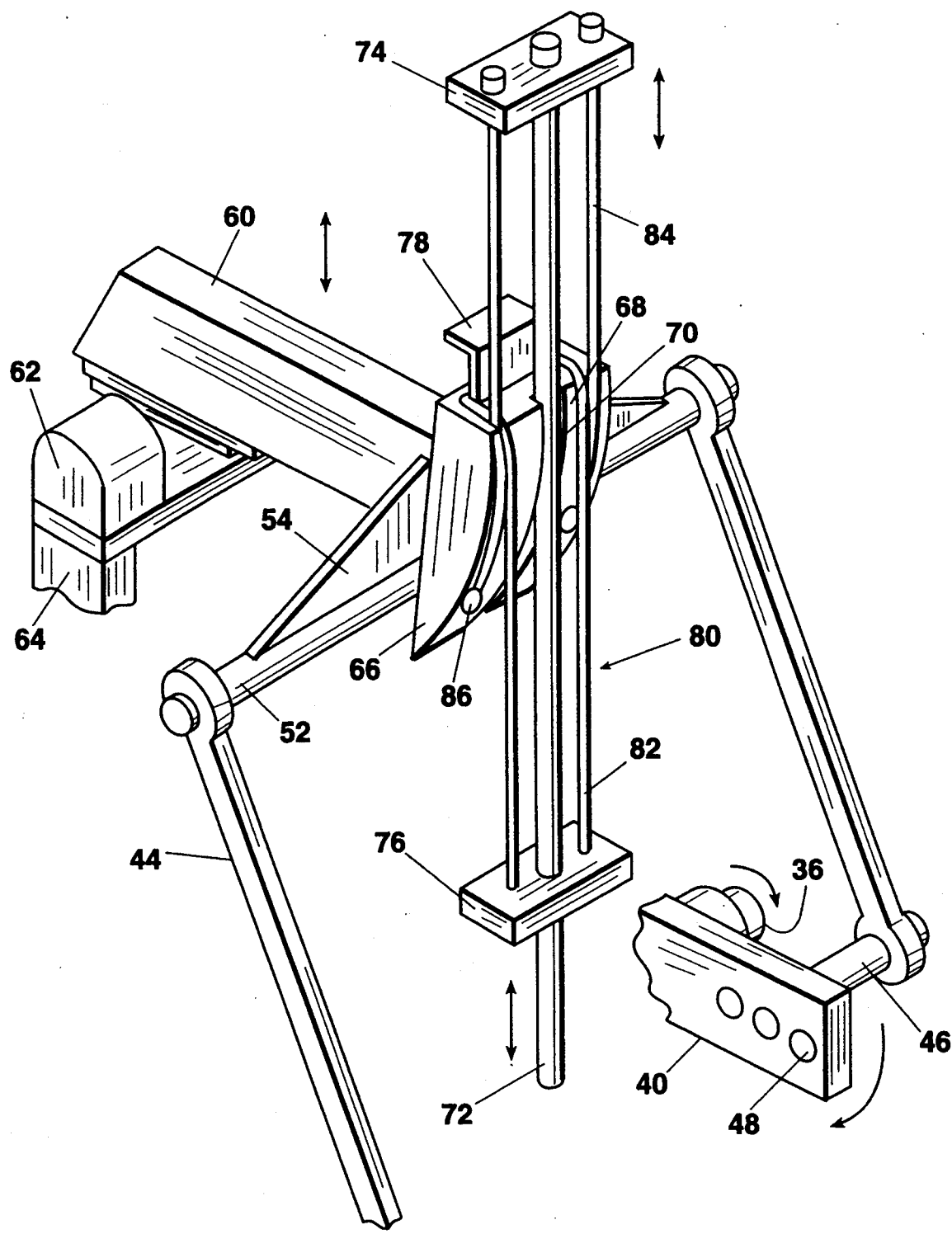
FIG. 3 is an enlarged fragmentary perspective view of a pump rod drive subassembly.

Shaft 14 is disposed at the input of the transmission casing 15. Shaft 14 is operatively connected by a gear train 35 to drive cross shaft 36. The gear train is indicated by dotted lines in FIG. 1, and is a commercially available, stock gear train. Shaft 36 is disposed at right angles to shaft 14 at a higher level. The outer ends of shaft 36 constitute stub shafts to which are secured balanced crank arms 40, 42. Both crank arms rotate in parallel in phase in the same direction simultaneously. Connected to the outer or rear ends of crank arms 40, 42 are two pitman arms 44 pivotally connected by pivot shafts secured in holes 48 in the crank arms 40,42. At their forward ends, the crank arms 40, 42 have massive arcuate weights 50 which balance the cross shaft 36. The upper ends of the pitman arms 44 are pivotally secured to a cross shaft 52 which in turn is carried by a gusset plate 54 secured near the forward end of a rocking beam 60. Beam 60 is rockably carried by bearings 62 mounted on spaced vertical posts 64 secured to the platform 20. At its forward end the rocking beam 60 has a massive tapered head 66 formed with a curved or arcuate face 68. A central slot 70 extends for the full length of face 68; see FIG. 2. This slot provides clearance for the vertically reciprocatable pump rod 72 shown in FIG. 1, and indicated by dotted lines in FIG. 2. Rod 72 is connected to sucker rod 73 by a coupling 75. The sucker rod terminates in a well casing from which water is pumped by reciprocating the sucker rod 73. Rod 72 extends axially through hole 19 in platform 20. FIG. 3 shows how the rocking beam 60 is operatively connected to the pump rod 72 for reciprocating it up and down during a water pumping operation. The pump rod carries an upper clamp bar 74 located above the head 66 of rocking beam 60, and a lower clamp bar 76 located below head 66. On top of head 66 is a cleat or hook 78. Entrained over and around hook 78 is an inelastic, flexible steel cable 80. The cable is arranged in a generally inverted U-shaped array with its bight engaged on hook 78. Lower ends 82 of cable 80 are secured to clamp 76, so that when head 66 of beam 60 moves upwardly, the pump rod 72 is pulled up to raise the sucker rod 73 and load of water being pumped. Upper ends of two other inelastic flexible steel cables 84 secured in laterally spaced positions to clamp bar 74. The cables 84 are dressed along the curved face 68 of head 66 and are secured by bolts 86 near the bottom end of head 66, on opposite sides of slot 70 and pump rod 72. When the beam 60 is rocked downwardly, head 66 moves down and pulls down on cables 84 so that the pump rod 72 is pushed axially downward to restore the pump rod to initial, lowermost position for starting another pumping cycle.

Figure 4:
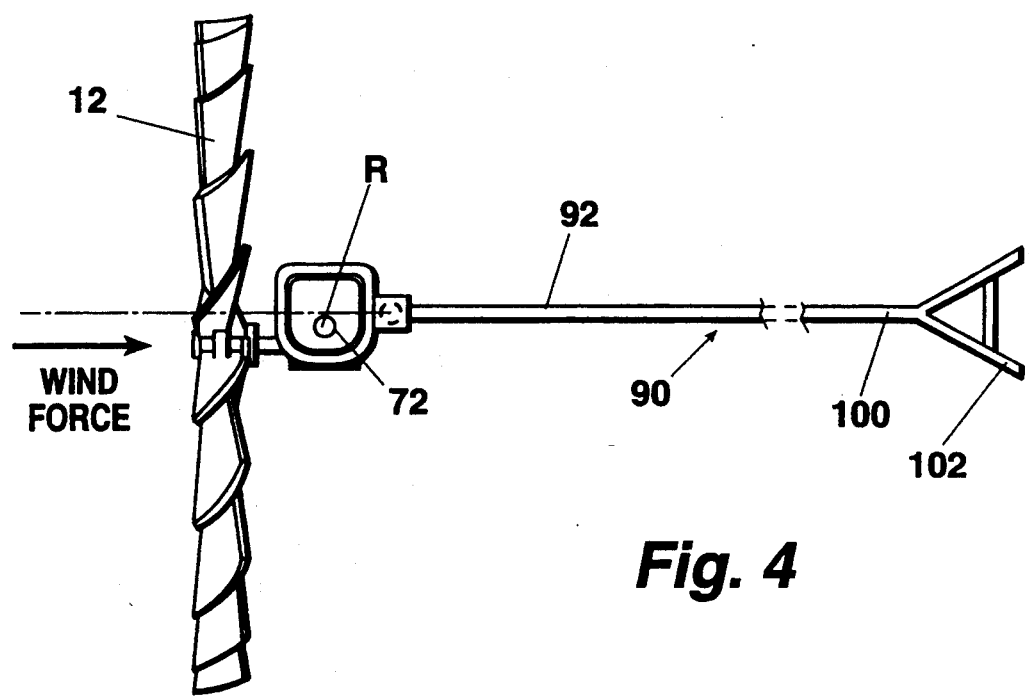
FIG. 4 and FIG. 5 are diagrammatic top plan views used in explaining the. furling operation of the windmill head.
Figure 5:
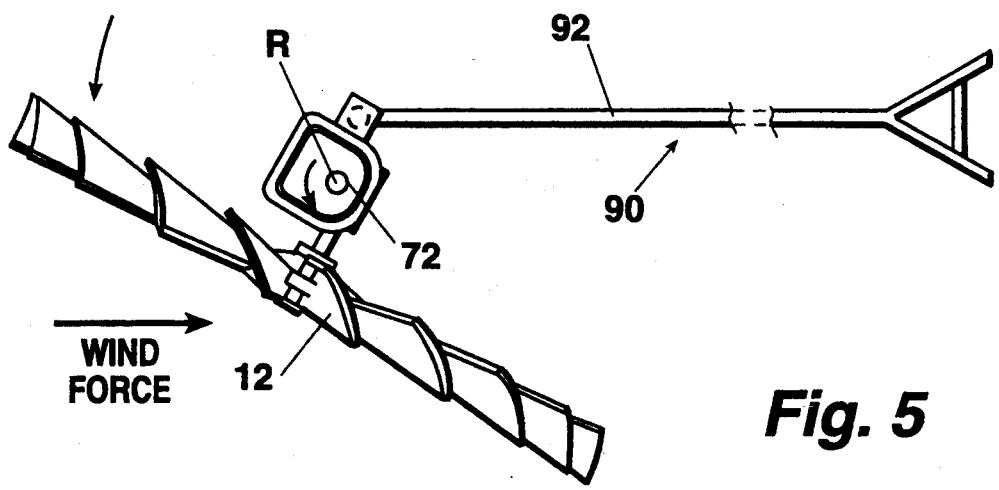

In order to keep the rotary fan 12 facing into the wind, there is provided a wind tracking tail assembly 90 shown in FIGS. 1, 4 and 5. Fan 12 is axially offset a few inches from the rotational axis R of platform 20 and pump rod 72. Tail assembly 90 includes a long horizontal rod or tail bone 92 secured to a rotatable coupling and guide rod 94 carried by upper and lower bearings 95, 96 on brackets 97, 98; see FIGS. 1,6. The brackets are mounted on platform 20. Rod 94 is disposed in a vertical plane but is inclined rearwardly from bottom to top. The forward end of tail bone 92 has a bore which slidably mounts the tail bone on rod 94. At the outer end of the tail assembly is a vertical trapezoidal panel 100. Two vertical panels 102 disposed in a V-shaped array are secured at their vertical apex to the rear edge of panel 100. This V-shaped array insures maximum turning moment of the tail assembly 90 in tracking the wind.

Figure 6:
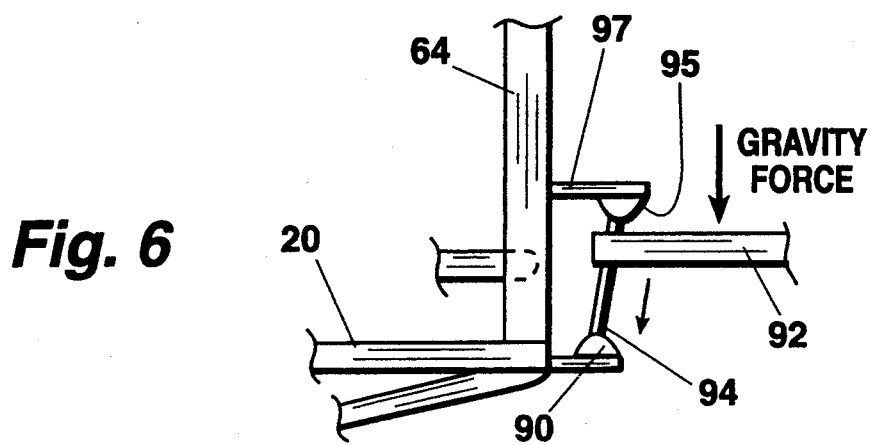
FIG. 6 is a fragmentary side view of tile tail bone and supporting rod similar to a portion of FIG. 1, showing the upwardly displaced position of the tail bone when the rotary fan is furled.

Fan 12 is laterally offset from the rotational axis 1R of platform 20 and pump rod 72 in a vertical plane spaced horizontally from the vertical plane of the tail assembly on the opposite side of the pump rod 72. Thus when wind of excessively high speed exerting sufficiently high wind force impinges on fan 12 a turning moment is generated and the fan 12 furls as indicated in FIG. 5 by turning with platform 20 to a position where the fan faces edgewise into the wind parallel to the tail assembly 90 while the tail assembly remains at an angle to and tracks the wind. Since the supporting rod 94 is inclined rearwardly, the tail bone 92 and panels 100, 102 are forced to move in an uphill direction when furling the fan. This places the tail assembly under gravitational pressure while the fan is furled and enables the tail assembly to move down as indicated in FIG. 6 to the position shown in FIGS. 1 and 4 to assume their normal working position shown in FIGS. 1 and 4 more easily when the wind speed decreases to normal speed. The entire furling and unfurling operation takes place automatically and is foolproof. There is no tensioned spring to get out of order and cause the windmill to fail.

It should be understood that the foregoing relates to only a preferred embodiment of the invention, which has been by way of example only, and that it is intended to cover all changes and modifications of the example of the invention herein chosen for the purposes of the disclosure, which do not constitute departures from the spirit and scope of the invention.

What is claimed is:

1. A water pumping windmill, comprising:
   a tower mountable in a stationary position;
   a horizontal platform rotatably mounted on said tower;
   a transmission mechanism mounted on said platform and having a rotary torque driven input shaft and a rotary torque driven output shaft operatively intercoupled with said input shaft and axially perpendicular thereto, the transmission mechanism serving to convert rotary input torque to rotary output torque in a predetermined speed ratio;
   a wind driven rotary fan connected to said input shaft to drive the same;
   a rotatable crank coupled to said output shaft;
   a pitman arm coupled to said crank to convert rotary motion of said output shaft to reciprocating motion of said pitman arm;
   a rocking beam pivotally carried by said platform and connected to said pitman arm for rocking said beam in a vertical plane parallel to said input shaft, said beam having a head movable up and down when said beam is rocked;

an axially vertical reciprocatable pump rod for cyclically lifting a pumped load of water;

a flexible cable connected between said pump rod and said head so that said pump rod is reciprocated by said head;

bearing means rotatably supporting said platform to permit said platform to rotate on a vertical axis, said pump rod having its axis of reciprocation coinciding with said vertical axis, said input shaft being spaced laterally from said vertical axis so that said fan said and platform rotate under a turning moment when the direction of wind force impinging on said fan changes;

a horizontal tail tracking assembly operatively connected to said platform to track said wind so that said fan is unfurled and faces into said wind as long as the magnitude of speed of said wind impinging on said fan remains below a predetermined magnitude; and coupling means on said platform, said tracking assembly being movably connected to said coupling means to rise up thereon to load said platform with gravitational force when said fan is furled, and to descend on said coupling means when said magnitude of speed of said wind decreases sufficiently to turn said platform and unfurl said fan.

2. A windmill as claimed in claim 1 wherein said tail tracking assembly includes:

a coupling rod axially disposed in an inclined position in a vertical plane and carried by said platform, said tail tracking assembly being connected to said coupling rod and movable upwardly thereon when said platform turns to furl said fan out of said wind when said magnitude of speed of said wind impinging on said fan exceeds said predetermined magnitude, so that said tail assembly gravitationally exerts downward pressure on said coupling rod and said platform while said fan is furled, and so that said tail assembly descends on said coupling rod to turn said platform and said fan when said speed of wind impinging on said fan falls below said predetermined magnitude, to unfurl said fan to face again into said wind.

3. A windmill as claimed in claim 1, wherein said head of said beam has a curved end face with a central lengthwise slot, said slot receiving said pump rod for guiding the same to move in a vertical direction as the rod moves up and down.

4. A water pumping windmill, comprising:

a tower mountable in a stationary position;

a horizontal platform rotatably mounted on said tower;

a transmission mechanism mounted on said platform and having an input shaft;

a wind driven rotary fan connected to said input shaft to drive the same;

an axially vertical reciprocatable pump rod for cyclically lifting a pumped load of water;

bearing means rotatably supporting said platform to rotate on a vertical axis, said pump rod having its axis of reciprocation coinciding with said vertical axis, said input shaft being spaced laterally from said vertical axis so that said fan said and platform rotate under a turning moment when the direction of wind force impinging on said fan changes;

transmission means connected with said input shaft for vertical reciprocation of said pump rod in response to the rotation of said fan;

a horizontal tail tracking assembly operatively connected to said platform to track said wind so that said fan is unfurled and faces into said wind as long as the magnitude of speed of said wind impinging on said fan remains below a predetermined magnitude; and coupling means on said platform, said tracking assembly being movably connected to said coupling means to rise up thereon to load said platform with gravitational force when said fan is furled, and to descend on said coupling means when said magnitude of speed decreases sufficiently to turn said platform and unfurl said fan.

5. A windmill according to claim 4 further comprising:

a horizontal tail assembly operatively connected to said platform; and a coupling rod axially disposed in an inclined position in a vertical plane and carried by said platform, said tail assembly being connected to said coupling rod and movable upwardly thereon when said platform turns to furl said fan out of said wind when said magnitude of speed of said wind impinging on said fan exceeds said predetermined magnitude, so that said tail assembly gravitationally exerts downward pressure on said coupling rod and said platform while said fan is furled, and so that said tail assembly descends on said coupling rod to turn said platform and said fan when said speed of wind impinging on said fan falls below said predetermined magnitude, to unfurl said fan to face again into said wind.

* * * * *